United States Patent Office 3,163,928
Patented Jan. 5, 1965

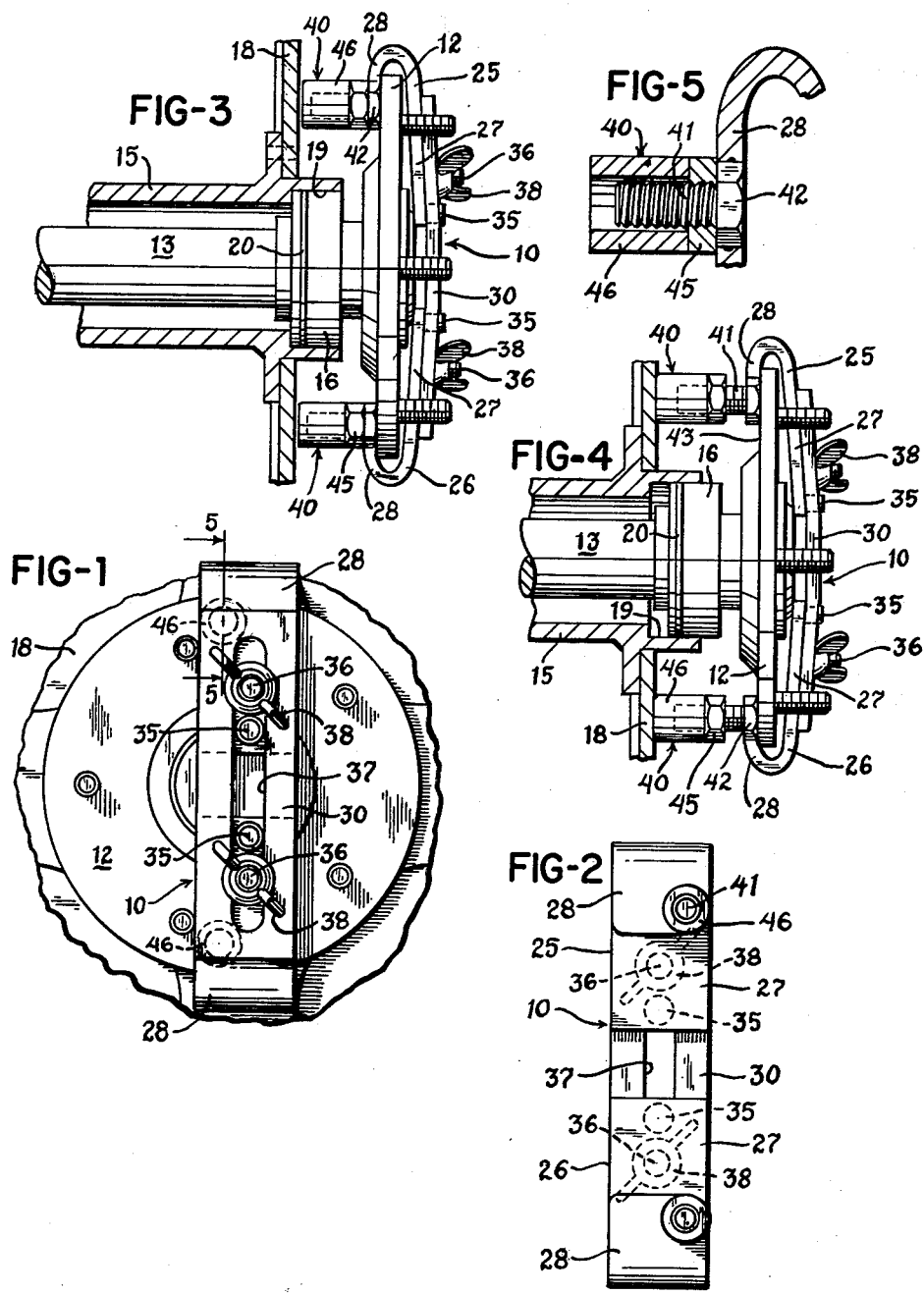

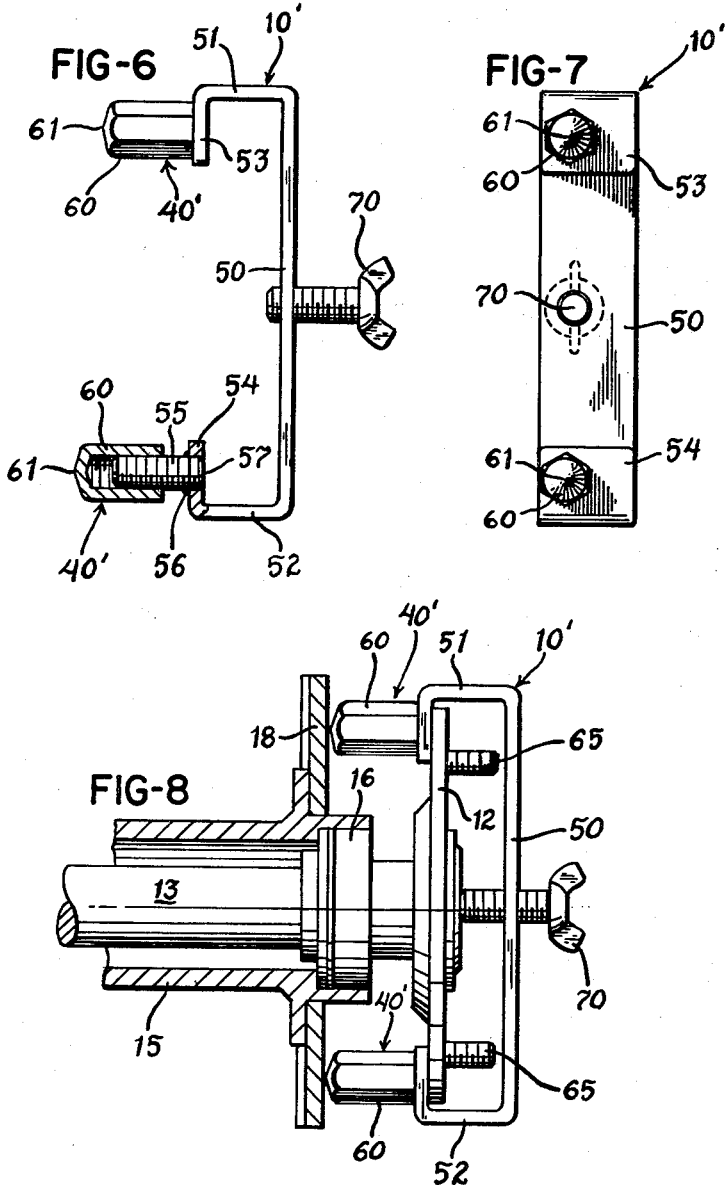

3,163,928
AXLE PULLER
Hubert R. Shafer, 909 NW. A St., Richmond, Ind.
Filed Feb. 15, 1962, Ser. No. 173,449
5 Claims. (Cl. 29—259)

This invention pertains to a puller and more particularly to an axle puller for removing the rear axle from the axle housing of a motor vehicle.

The semi-floating hypoid rear axles which are commonly used for automotive vehicles employ a bearing at the outer end thereof which is normally press fitted onto the axle and which forms a close fit with the axle housing, for supporting the end of the axle for rotation in the axle housing. This bearing, which may be either a roller or a taper bearing, is normally lubricated by oil from the differential housing. However, it is not uncommon for these bearings to fail by reason of a loss in oil supply, or because of defective bearing components, overheating, and the like.

Incipient bearing failure is seldom noticed by the operator of the motor vehicle, and total bearing failure can occur rapidly and without warning. Such failure normally is accompanied by excessive heat which freezes or partially freezes the outer portion of the bearing to the axle housing, making ineffective the normal or usual axle removal procedures. As a result of this known difficulty, one automobile manufacturer allows three hours labor time for the removal of a rear axle and replacement of the bearings. While a skilled person can normally pull an axle with a frozen bearing within three hours, often the bearing is so tightly frozen in the axle housing that considerably more time is required.

This invention provides an axle puller which substantially reduces the amount of time necessary for the removal of a rear axle for the replacement of a defective or frozen bearing thereon. The puller of this invention is characterized by its ease of operation, its simplicity and ruggedness of construction, and its adaptability to differing axle flanges and backing plate arrangements of motor vehicles.

An object of this invention is to provide an axle puller for removing the rear axle from an automobile rear axle housing characterized by its speed and ease of operation.

Another important object of this invention is to provide a rear axle puller which applies a direct axle withdrawing force on opposite positions on the inside surface of an axle wheel flange.

Another object of this invention is the provision of an axle puller which includes adjustable support for a pair of operators which are adapted for interposition and direct force applying between an axle assembly backing plate and an axle wheel flange.

Other objects and advantages of the invention will be apparent from the following description, the accompanying drawing and the appended claims.

In the drawing—

FIG. 1 is a front elevational view of the axle puller shown as being attached to a rear axle flange prior to pulling the axle;

FIG. 2 is a rear elevational view of the axle puller;

FIG. 3 is a side view of the puller shown as being assembled and supported on the axle flange, with a portion of the axle housing and backing plate being shown in section;

FIG. 4 is a view similar to FIG. 3 showing the axle partially removed;

FIGURE 5 is an enlarged vertical fragmentary section taken generally along the line 5—5 of FIG. 1;

FIG. 6 is a partly broken side elevation of a modified puller;

FIG. 7 is a front elevation of the puller of FIG. 6; and

FIG. 8 shows the puller of FIGS. 6–7 mounted on an axle flange.

Referring to the drawings, which illustrate preferred embodiments of the invention, an axle puller constructed according to this invention is shown at 10 in FIG. 1 as being mounted on the wheel supportig flange 12 of a rear axle 13. The axle 13 is rotatably mounted within a relatively fixed axle housing 15 on a bearing 16. The axle 13 extends through the axle housing 15 outwardly from a backing plate 18, in a typical rear axle assembly. The backing plate 18 commonly carries the brake shoe supporting, adjusting and operating mechanism. These parts of the rear axle assembly are not shown in the drawings, and generally are positioned radially outwardly of the peripheral extent of the wheel flange 12. Accordingly, these components do not interfere with the operation of the puller 10.

The bearing 16 may be received within a suitable cup or recess 19 formed within the end of the axle housing 15, and may be provided with a grease seal which may consist of one or more O-rings 20 received within suitable peripheral grooves formed on the bearing.

The bearings 16 are normally press fitted onto the axle 13 by means of a hydraulic press. Also, the outer race of the bearings form a close clearance fit with the recess 19 of the axle housing. When such bearing becomes damaged, it is necessary to pull the axle in order to replace the bearing. The bearings 16 are commonly ruined by leaking of the oil seal at the O-ring 20 resulting in a failure of lubrication to the bearing and its resulting loss. During such failure, it is common for the bearing to achieve very high temperatures beyond its design temperature and as a consequence become most difficult to remove from the axle housing.

The puller of this invention utilizes the principle of direct force application to the inside surface of the wheel flange 12 with the reaction being placed against the backing plate 18. This direct application of force is applied at diametrically opposed positions on the inside surface of the axle flange.

The puller 10 includes adjustable clamp means having oppositely disposed inwardly turned ends which are proportioned to be receivable over the axle flange 12 at the opposite sides thereof. This clamp means more particularly consists of a pair of clamp members 25 and 26 formed of strap steel and each having a relatively flat outer portion 27 terminating in an inwardly turned end 28 proportioned to be received over the axle flange at one side thereof. The clamp members 25 and 26 are joined in adjustable spaced apart relation by a removable connecting strap 30 which extends between the clamp members 25 and 26 and which is proportioned to overlie a part of the flat outer portion 27 of each of the clamp members. Although the outer portions 27 of the clamp members 25 and 26 may be flat for convenience of manufacture, the connecting strap 30 is preferably formed with a slight curvature or bend in the middle so as to lie flat against each of the clamp members 25 and 26, and to bridge the usual wheel positioning boss formed in the center of the axle flange 12.

Each of the clamp members 25 and 26 is provided with a guide pin 35 and a short stud bolt 36 projecting outwardly therefrom at the outer portion 27 which are received within a suitable elongated slot 37 formed in the connecting strap 30. Suitable retaining devices such as the wing nuts 38 are threaded on the stud bolts 36 to secure the clamp members in a predetermined spaced apart adjusted position on the strap 30. The clamp members 25 and 26 and the connecting strap 30 together comprise the body of the wheel puller which is rigidly held together as a unit by the wing nuts 38 after it is positioned in place on the wheel flange 12.

The inwardly turned ends 28 are each provided with an operator 40 for applying direct axial withdrawing force against the inside surface of the flange 12, one of the operators 40 being shown in enlarged sectional detail in FIG. 5. The operator 40 may consist of a machine bolt 41 having a head 42 which is received within a suitable notch or opening formed in the end 28 so that the head 42 is flush with the inside surface of the end 28 and is positioned directly adjacent the inside surface 43 of the flange 12 in the assembled position of the puller. The bolt 41 may be suitably secured in aligned position on the ends 28 such as by welding so that it lies within the radial extent of the flange 12 and generally parallel to the axis of the axle 13.

A nut 45 is threaded on each of the bolts 41 and a tubular sleeve 46 is received over the bolts against the nuts 45 which comprise pusher means for engaging the backing plate. The sleeves 46 may be formed of any suitable durable material, and are preferably formed of bronze or brass for sufficient strength and low friction, and to avoid damage to the back-up plate 18. It is obvious that the sleeve 46 and nut 45 may be made in a single piece. The sleeve 46 should extend beyond the terminal length of the bolt 41 with an outer end adapted to press against the adjacent surface of the backing plate 18.

The inside surface of the ends 28 and heads 42 are proportioned to lie flat agaisnt the inside surface of the flange 12. Also, the operators 40 including the bolts 41 apply their force axially in withdrawing the axle. The center line of the operators 40 are preferably offset from the center of the clamp members 25 and 26 to provide clearance when assembled on the usual five stud wheel flange, as shown in FIG. 1. This offset permits the operators 40 to be positioned substantially oppositely from each other while the clamp members and the connecting strap lie along a chord line which is offset from the center of the axle.

In the operation of the first embodiment of this invention, one or more of the wing nuts 38 are loosened or removed and the clamp members 25 and 26 are hooked over the opposite edges of the wheel flange 12 with the operators 40 received at generally opposite locations. The nuts 45 should be run into their fully retracted positions as shown in FIGS. 3 and 5, and the sleeves 46 inserted over the projecting ends of the bolts 41 prior to assembly. After the puller 10 is in place, a wrench is then applied to the nuts 45 one at a time to force the flange 12 outwardly from the backing plate 18, thus pulling the bearing 16 out of the axle housing 15.

It will be seen that a major portion of the withdrawing force is carried within the operator 40 and is applied directly to the inside surface of the flange 12 through the head 42 of the bolt 41. Accordingly, very little strain is placed upon the clamp members or the connecting strap which serve principally as locating, supporting and positioning means for the operators 40. It has been found that with the puller of this invention, an axle with a frozen bearing can be removed in approximately 15 to 20 minutes time as compared to 3 to 3½ hours using ordinary methods and tools.

The embodiment of FIGS. 6–8 shows a modified form of the invention which has particular advantage where the puller is to be used with a particular type of axle and wheel assembly, such as for a particular make or model of automobile. FIG. 6 also shows a modified arrangement of the operator 40′ which may be used in place of the operator 40 in the embodiment of the invention shown in FIGS. 1–5.

In FIGS. 6–8, the puller 10′ is shown as being formed with an integral, unitary body of strap material with a generally straight back 50 having opposite forwardly turned portions 51 and 52 each terminating with inwardly turned integral ends 53 and 54. Operators 40′ are carried on the inwardly turned ends, and are offset in the manner described above in connection with the operator 40 in FIGS. 1–5.

The operators 40′ include a threaded stud bolt 55 which is received in openings which may be stamped or tapped in the inwardly turned ends 53 and 54. The stud bolts 55 may be secured by butt welds at 56 and have the surface 57 of their inner ends flush with the inside surface of the puller ends to apply force directly to the inside surface of the axle flange 12.

A dome nut 60 is threaded onto each of the stud bolts 55, and may be provided with an outer hexagonal surface for the application of a wrench, and with a pointed operating end 61. The pointed end 61 engages the front surface of the backing plate 18 to locate the puller 10′ and prevent slipping, or turning of the axle.

The depth of the forwardly turned portions 51 and 52 is such that the back 50 stands off from the flange 12 and clears the stud wheel mounting bolts 65 of the axle flange 12. Means for supporting the puller 10′ to the axle flange 12 includes a fast-spin wing bolt 70 which is threadedly received centrally of the ends of the back 50, and which may be offset from the center thereof toward the side on which the operators 40′ are mounted, as shown. The fastening bolt 70 is movable by rotating inwardly into contact with the central raised portion of the axle flange to hold the puller of the axle. However, once the dome nuts 60 are rotated, the retracting force applied thereby serves to hold the puller in mounted position on the axle flange without further assistance from the bolt 70.

The operation of this embodiment is substantially the same as that described above in connection with FIGS. 1–5. The puller 10′ is readily mounted on the axle flange by first assuring that the dome nuts 60 are fully retracted, and the fastening wing bolt 70 is partially retracted as shown in FIG. 6. The wing bolt may then be spun into position to hold the body 50 in place, and then equal turning is applied to each of the dome nuts 60 to provide a uniform retracting force on the axle flange without tending to cock or displace the axle, thereby effecting withdrawal of the axle and attached bearing.

While the forms of apparatus herein described constitute preferred embodiments of the invention, it is to be understood that the invention is not limited to these precise forms of appartaus, and that changes may be made therein without departing from the scope of the invention which is defined in the appended claims.

What is claimed is:

1. A puller for removing a flanged rear axle from a combined axle housing and back-up plate of the rear axle of an automotive vehicle, comprising clamp means having a body adapted to be received transversely adjacent the outer surface of said axle flange and formed with oppositely disposed radially inwardly turned ends receivable over the axle flange at opposite sides thereof, a bolt fixed to each of said ends radially inwardly of the periphery of the axle flange and extending generally axially toward the axle plate in the mounted position of said clamp means with an inner end of said bolt positioned for direct force applying contact against the inside surface of the axle flange, fastening means on said clamp means for securing said clamp means on the axle flange, and means threaded on said bolts and movable by a wrench against the back-up plate in said mounted position to force said bolts against the flange effecting withdrawal of the axle from the housing.

2. A puller for removing a flanged rear axle from a combined axle housing and back-up plate of the rear axle of an automotive vehicle, comprising clamp means formed of strap material having a body adapted to be received transversely adjacent the outer surface of said axle flange and formed with oppositely disposed radially inwardly turned ends receivable over the axle flange at opposite sides thereof, means defining an opening in each of said ends, bolts fixed to each of said ends radially inwardly of the periphery of the axle flange and extending generally axially toward the axle plate in the mounted position of said clamp means with an inner end thereof received and welded in position in each of said openings with said inner end flush with the inside surface of said strap material for direct force applying contact against the inside surface of the axle flange, fastening means on said clamp means for securing said clamp means on the axle flange, and means threaded on said bolts and movable by a wrench against the back-up plate in said mounted position to force said bolts against the flange effecting withdrawal of the axle from the housing.

3. A puller for removing an axle and wheel supporting flange having five wheel supporting stud bolts thereon from an axle assembly which includes a fixed back-up plate, comprising clamp means formed of strap material having a back adapted to be received transversely adjacent the outer surface of said flange generally along a chord line offset from the center line of said axle adjacent two of said stud bolts terminating in inwardly turned ends adapted to be received inwardly of the flange periphery and defining opposite ends of the puller, means removably supporting said back adjacent the outer surface of said axle flange in non-interfering relation to said stud bolts, an operator mounted in offset relation on each of said ends positioned inwardly of the peripheral edge of the flange in the mounted position of said puller, the degree of offset of each of said operators being such as to position substantially said operators on a diameter of said flange, each said operator including a bolt extending axially from said inwardly turned ends toward said back-up plates, and pusher means threaded on each of said bolts having an outer end proportioned to engage said back-up plate and rotatable on said bolt to effect the withdrawal of said axle from said housing.

4. The puller of claim 3 wherein said back of said clamp means is formed of a single piece of strap material integral with said ends and extends in a generally straight line between said ends, and wherein said removable support means includes a bolt threaded for generally axial movement in said back into engagement with said axle.

5. The puller of claim 3 wherein said back is formed in three parts including a pair of opposite clamp members each integral with one of said ends and a central connecting strap proportioned to overlie a portion of each of said clamp members, and said removable supporting means for said clamp means including means adjustably securing said clamp members with said connecting strap.

References Cited in the file of this patent

UNITED STATES PATENTS 3,025,595    Stafford _____ Mar. 20, 1962

FOREIGN PATENTS 664,000    France _____ Apr. 16, 1929